United States Patent

[11] 3,556,484

| [72] | Inventors | Walter H. Moller;<br>Joseph H. Wilson, 1656 21st Ave. E.,<br>Seattle, Wash. 98102 |
|---|---|---|
| [21] | Appl. No. | 735,744 |
| [22] | Filed | June 10, 1968 |
| [45] | Patented | Jan. 19, 1971 |

[54] AERIAL TRAMWAY POWER AND CONTROL MEANS
12 Claims, 3 Drawing Figs.

[52] U.S. Cl. .................................................. 254/184,
60/52, 60/53, 212/84, 212/88, 254/172
[51] Int. Cl. ........................................................ B66d 1/26
[50] Field of Search............................................ 254/150,
172, 173, 185, 150FH, 186, 147; 212/76, 78, 88,
94, 97; 60/52USP, 53WR

[56] References Cited
FOREIGN PATENTS

| 151,362 | 5/1904 | Germany.................... | 254/184 |
| 668,297 | 11/1938 | Germany.................... | 254/184 |
| 876,596 | 5/1953 | Germany.................... | 254/150F.H. |
| 1,102,687 | 3/1961 | Germany.................... | 254/150F.H. |

*Primary Examiner*—Harvey C. Hornsby
*Attorney*—Clinton L. Mathis

ABSTRACT: The invention has primary use in connection with aerial tramways, where a traveling carriage is supported by a cable having its end portions supported, respectively, at a head station and a remotely disposed tail station. First and second motors are designed or arranged in paired relation so that the movements of their yokes in a given direction will increase the torque of the first motor and decrease the torque of the second motor and movements of their yokes in the opposite direction will decrease the torque of the first motor and increase the torque of the second motor. Link means are provided interconnecting the yokes of said two motors so that the yokes move simultaneously. Lever means are connected with said link means for determining the position of said link means.

The said first and second motors exert thrust in opposite directions on the carriage and the direction of travel of the carriage, depends on the one motor then having the greater torque, which functions to provide tension to tow or retrieve the carriage, and the other motor functions to provide countertension or drag.

PATENTED JAN 19 1971

INVENTORS
WALTER H. MOLLER
JOSEPH H. WILSON
BY
Clinton L. Mathis
ATTORNEY

AERIAL TRAMWAY POWER AND CONTROL MEANS

Our invention relates to an aerial tramway and more particularly to the means to tow a cable supported carriage away from a first station, as a head spar, and toward a remotely disposed second station, as a tail spar, and to return, or retrieve, said carriage from said tail spar to said head spar. Our invention is also applicable to an elevator car, which travels at an angle to the horizontal, as vertically, and where the cables connect to opposite portions, as the top and bottom, of said car and tension and countertension are provided in such cables. In the interest of illustration, our invention is illustrated and described in connection with an aerial tramway.

In the prior art, substantial difficulties were encountered in providing the desired control means and responsive mechanism to provide the desired tension in the cable functioning to move the carriage in a given direction and to provide the desired countertension or drag in the other cable and to provide for simultaneous control of such tension and countertension.

A primary object of our invention is to provide new and novel power means for the towing connected with the carriage of an aerial tramway in combination with control means for said power means.

Another object is to provide a first variable displacement hydraulic motor, having a first movable yoke controlling the output torque of said first motor, providing tension in a towing cable connected with a carriage in combination with a second variable displacement hydraulic motor, having a second movable yoke controlling the output torque of said second motor, providing a countertension or drag on a retrieving cable connected with said carriage.

More particularly, it is an object to design or arrange said two motors in paired relation so that the movements of their yokes in a given direction will increase the torque of the first motor and decrease the torque of the second motor and movements of the yokes in the opposite direction will decrease the torque of the first motor and increase the torque of the second motor. With the torques of said motors equal, the carriage connected with said motors will be at rest and with the torques unequal, the motor having the greater torque will overpower the other motor and determine the direction of travel of the carriage, i.e., towed or retrieved.

A further object is to provide link means interconnecting the yokes of said first and second motors so that the two yokes will move simultaneously and said yokes may be moved by a common means, as a lever connected therewith, and movement of said common means will cause simultaneous increase in the torque of the first motor with decrease of torque of the second motor or decrease of torque of the first motor with increase of torque of the second motor.

A further object is to provide in combination a variable displacement hydraulic motor-pump having an overcenter movable yoke and which functions as a pump to provide fluid under pressure in fluid pressure conduit means leading to said first and second motors, when said yoke is disposed from one side of center and functions as a motor receiving fluid under pressure from said fluid pressure conduit means, when the yoke is disposed from the other side of center.

A further object is to provide in the combination, a hydraulic actuated piston means for moving said movable yoke of said motor-pump and which hydraulic actuated piston means is triggered by, or responsive to, changes in fluid pressure in said fluid pressure conduit means.

A further object is to provide a sliding valve or spool mechanism having a plurality of spool positions, the spool positions obtaining in response to the extent of fluid pressure in said fluid pressure conduit means. More particularly, it is an object to provide a sliding valve mechanism having three spool positions, one position which provides a connection between said fluid pressure conduit means and one side of a piston in the hydraulic actuated piston means and a connection between the other side of said piston and a fluid reservoir; a second position which blocks connection between said fluid pressure conduit means and said reservoir; an a third position which provides a connection between said fluid pressure conduit means and the other side of the piston in the hydraulic actuated piston means and a connection between the said one side of said piston and said fluid reservoir.

Another object is to provide such a sliding valve mechanism, wherein the sliding valve or spool is urged in one direction by spring means and is urged in the opposite direction by fluid under pressure from said fluid pressure conduit means and when the same are in balance, the said second position of the spool will block fluid from passing from said fluid pressure conduit means to said reservoir.

Another object is to provide a spring-loaded sliding valve mechanism or spool which is adjustable in spring tension to match a predetermined desired fluid pressure in said fluid pressure conduit means.

Another object is to provide in combination, an electric motor to drive said variable displacement hydraulic motor-pump having an overcenter movable yoke, so when motor-pump is functioning as a motor it will drive said electric motor and the energy so involved will be dissipated by the electric motor functioning as an electric generator.

Another object is to provide a spring-loaded sliding valve mechanism or spool that will automatically position the yoke of said motor-pump in response to a change in pressure in said fluid pressure conduit means.

Another object is to interconnect the low-pressure and high-pressure conduits leading from, and to, said first an second hydraulic motors, providing for regenerative fluid flow of liquid.

Other objects of our invention will become apparent or implicit as the description of our invention proceeds in connection with the drawings, wherein like reference numerals refer to like parts. In the drawings.

Figure 1:
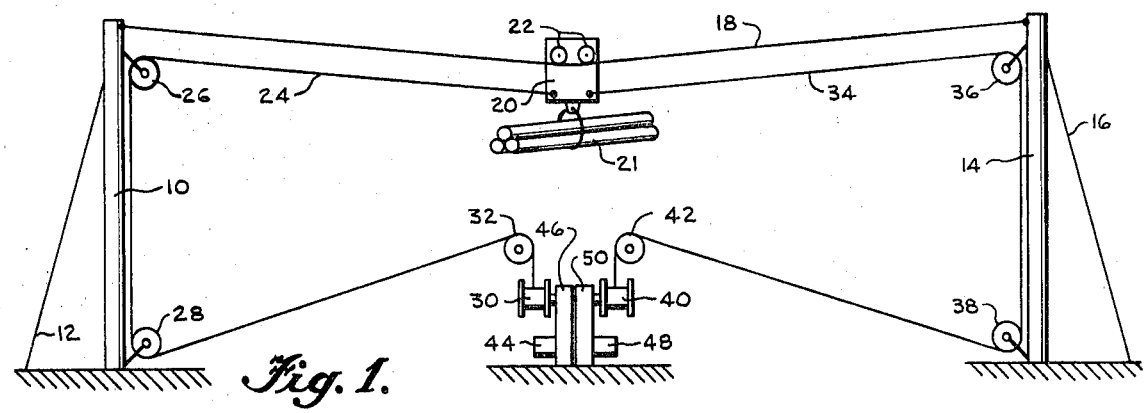
FIG. 1 is a schematic view showing our invention applied to an aerial tramway, wherein each of the spaced apart spars or masts is relatively fixed, as in logging operations.

Our invention is applicable to aerial tramways and this regardless of the environment of use of the same. For example, in FIG. 1, a first mast or head spar 10 is held against displacement and a guy wire 12 is illustrative of means suitable for such purpose. A second mast or tail spar 14 is disposed remotely from said mast 10 and at a desired distance and such mast 14 is held against displacement by any suitable means, illustrated by guy wire 16. A carriage support or skyline or highline 18 connects between the masts 10 and 14 and is placed under desired tension by conventional means (not shown). Guy wire and lines as herein mentioned are generally woven wire ropes and in the interest of brevity are referred to as wire and lines. A carriage 20 is provided with wheels 22 so that the carriage 20 will roll or travel on skyline 18 and may be hauled either toward or away from the mast or head spar 10. A retrieving line 24 connects with carriage 20, for supporting a load typified by logs 21, to move said carriage 20 in a given direction (returning or retrieving toward head spar 10) and said line 24 passes over sheaves 26 and 28, supported, respectively, at the top and bottom portions of head spar 10, and is then guided to a drum 30 by any suitable means, as a sheave means 32. A towing line 34 connects with carriage 20 to move carriage 20 in the opposite direction (i.e., toward tail spar 14 and away from head spar 10) and said line 34 passes over sheaves 36 and 38, supported, respectively, at the top and bottom portions of the tail spar 14, and then is guided to a drum 40 by any suitable means, as sheave means 42. The drum 30 is powered by a hydraulic motor-pump 44 preferably acting through suitable reduction gears in gearbox 46. Similarly, the drum 40 is powered by a hydraulic motor-pump 48 preferably acting through suitable reduction gears in gearbox 50. Drums 30 and 40 are driven in opposite directions so when drum 30 is pulling in retrieving line 24, it overpowers motor 48 and line 34 acts as a drag and when drum 40 is pulling in towing line 34, it overpowers motor 44 and line 24 acts as a drag. In the foregoing description of FIG. 1, a skyline installation has been described wherein both masts 10 and 14 are spaced apart and each is relatively fixed.

Figure 2:
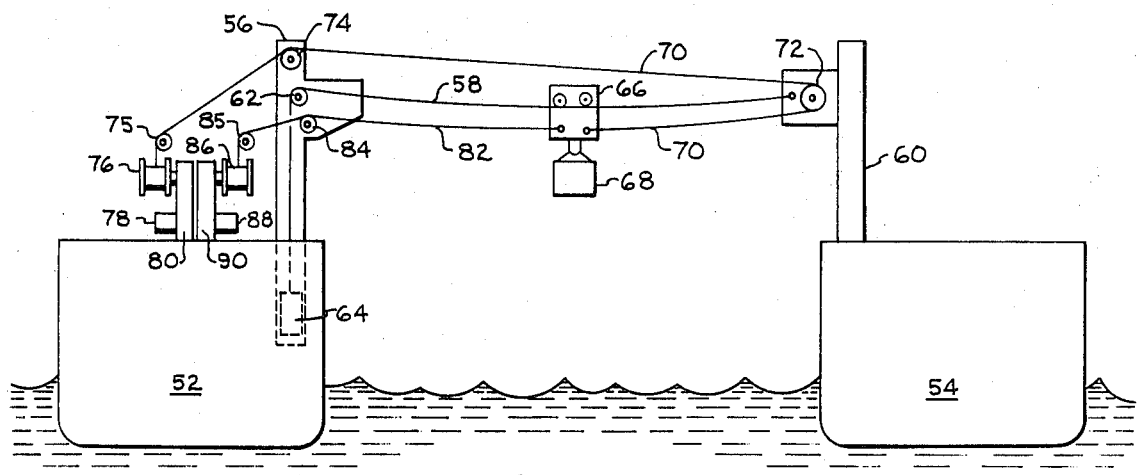
FIG. 2 is a schematic view showing the invention, where the space-apart spars or masts are not relatively fixed, as in tramways used between two vessels, one or both of which is on a body of water.

Now referring to FIG. 2, a typical installation is depicted wherein one or both of the two spaced-apart masts is relatively movable and not fixed. In such FIG. 2, two ships on a body of water are shown, each carrying a mast or king post. A vessel 52, to be unloaded, is disposed in spaced relation to a vessel 54, to receive the load from vessel 52.

A skyline 58 has one end portion thereof connected with a king post or tail post 60 carried by vessel 54. This skyline 58 extends to vessel 52 and is reeved about sheave means 62, supported by king post or head post 56 on vessel 52. Line 58 continues to, and is connected with, conventional counterweight skyline tensioning means 64. Skyline 58 supports for traveling movement thereon wheeled carriage 66 which supports load 68. The desired tension on the skyline 58 will be provided by tensioning means 64 and the extent thereof will be determined by due consideration of the potential load on skyline 58, such as possible weight of load 68, weight of carriage 66, weight of the lines supported by line 58 and the weight of line 58, the catenary desired in line 58, and the like. The cable tensioning means 64 will draw in or pay out line of the skyline 58 to compensate for movement of either vessel 52 or 54 or the relative movement therebetween.

A towing line 70 has one end portion connected with carriage 66, is reeved about sheave means 72, supported by tail post 60, and continues to and is reeved about sheave means 74, supported by king post 56 and reeved about sheave means 75. Line 70 continues and its other end portion is reeved on drum 76. Drum 76 is powered by hydraulic motor 78 and preferably through reduction gears in gearbox 80.

A retrieving line 82 (for retrieving or returning carriage 66 to post 56) has one end portion connected with carriage 66, extends to and is reeved about sheave means 84, supported by head post 56, reeved about sheave means 85, and continues and has its other end portion reeved on drum 86. Drum 86 is powered by hydraulic motor 88 and preferably through reduction gears in gearbox 90.

Figure 3:
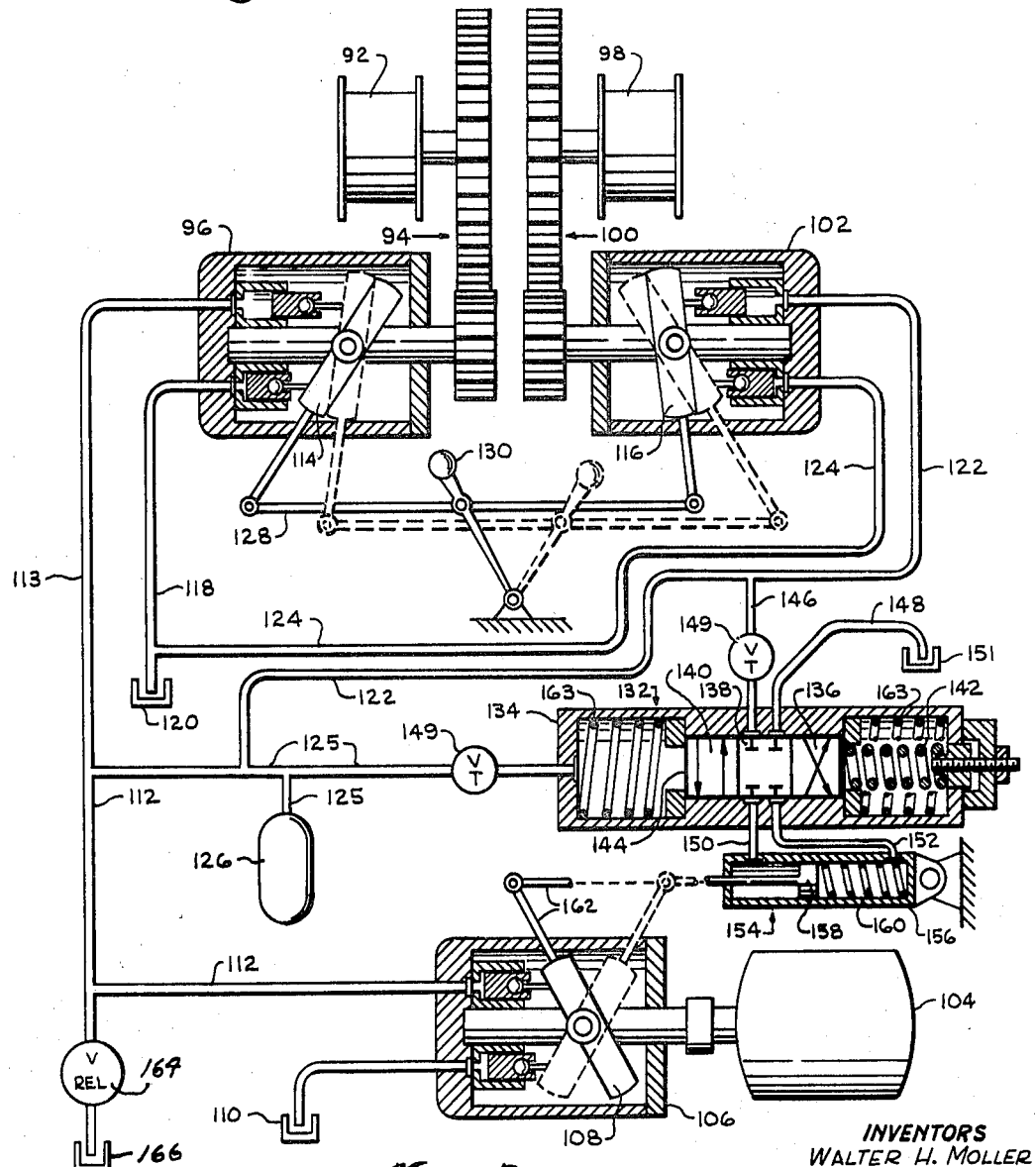
FIG. 3 is a diagrammatic view showing the relation between operative parts of the hydraulic means used in connection with our invention, and showing therein a position that parts of the hydraulic control valve mechanism may assume, in said figure, the sliding valve mechanism or spool is schematically illustrated.

Now referring to FIG. 3 of the drawings, the drum 92 will represent either the drum 30 of FIG. 1 or 86 of FIG. 2; gear train 94, either the gears in gearbox 46 of FIG. 1 or those in gearbox 90 of FIG. 2; and hydraulic motor 96, either the motor 44 of FIG. 1 or the motor 88 of FIG. 2. Drum 98 will represent the drum 40 of FIG. 1 or 76 of FIG. 2; gear train 100, either the gears in gearbox 50 or FIG. 1 or the gearbox 80 of FIG. 2; and the hydraulic motor 102, either the motor 48 of FIG. 1 or 78 of FIG. 2. Thus, when different forces are applied to or by the motors 44 and 48 of FIG. 1 as respects the forces applied to or by the motors 88 and 78 of FIG. 2, due to the different environments in which said motors are being operated in FIGS. 1 and 2, the same can be readily described in connection with FIG. 3 of the drawings.

In FIG. 3 of the drawings, a source of power, as electric motor 104 drives pressure compensated pump-motor 106 having an overcenter yoke 108. In such pump-motor 106, yoke 108 may be moved past center and when to the left of center (e.g., as shown in full lines in said FIG. 3), pump-motor 106 functions as a pump to pump liquid from tank or reservoir 110 into conduit 112. When said yoke is to the right of center (e.g., as shown by dash lines in FIG. 3), pump-motor 106 functions as a motor receiving liquids under pressure from conduit 112 and discharging liquid into tank 110. When pump-motor 106 functions as a motor, electrical energy resulting is dissipated in driving torque applied to electric motor 104 so that electric motor 104 functions as a generator.

Liquid under pressure in conduit 112 is delivered to conduit 113 and thence to hydraulic pump-motor 96 (motor-pump 96 normally functions as a motor) and the torque of such a motor 96 depends upon the angular position of its yoke 114. Both motors 96 and 102 normally function as motors and the circumstances under which they function as pumps will be described later in connection with conditions which may occur in connection with FIG. 2 of the drawings. Thus, for current considerations, both motor-pumps 96 and 102 will be referred to and termed as motors 96 and 102. Also, motors 96 and 102 are what may be termed right- and left-handed — the torque of 96 increases as its yoke 114 is angularly moved in a clockwise direction as viewed in FIG. 3 and the torque of motor 102 increases as its yoke 116 angularly moves counterclockwise as viewed in said FIG. 3. When motor 96 is functioning as a motor, it receives liquid under pressure from conduit 113 and liquid discharges therefrom into conduit 118. The inlet conduit to motor 102 (when functioning as a pump) is conduit 124, from conduit 118 and reservoir 120, and thus energy present from fluid under pressure in conduit 118 is utilized under such conditions. When motor 102 is functioning as a motor, it receives liquid under pressure from conduits 112 and 122 and discharges liquid therefrom via conduit 124 to tank or reservoir 120 or to infeed conduit 118 to motor 96 (when functioning as a pump), thus utilizing the fluid pressure of said discharging liquids under such conditions.

Conduits 112, 113, and 122 are connected by conduit 125 to a conventional accumulator cushion 126 which has liquid and a suitable gas therein for usual purposes, such as supplying hydraulic fluid under pressure, when the movable yoke of pump-motor 106 is in no-flow or center position and provides desirable cushioning effects.

The yokes 114 and 116 of motors 96 and 102 are mechanically interconnected by link means 128 so that the yokes move simultaneously and the torque of motor 96 is increased as the torque of motor 102 is decreased and vice versa. In other words, the full line position of yoke 114 in FIG. 3 shows motor 96 at a maximum torque position and the full line position of the yoke 116 of motor 102 shows such motor 102 at a minimum torque position and the dash line positions show the opposite. A common means for moving link means 128, as lever 130, provides the desired angular positions of the yokes 114 and 116, as the lever 130 may be moved from its full line position shown in FIG. 3 to its dash line position shown in FIG. 3 and into intermediate positions therebetween.

Conduit 125 (from conduit 112) connects with a yoke positioning valve control means 132. Valve control means 132 has a housing 134 and slidably mounted therein, is a slide valve or spool 144 comprising spool chambers 136, 138, and 140; spring 142; and two spaced deadband springs 163. Spring 142 has a value predetermined to balance a predetermined fluid pressure impinging on spool 144 from conduit 112 and its connected conduits, including conduit 125, and is preferably adjustable so that a selected pressure will result in conduit 112. This fluid pressure is selected in accordance with the load carried by the aerial tramway, weight of cables, catenary of line desired, etc. Springs 163 provide deadband effect for spool 144. Each spring 163 has a predetermined spring rate and preload causing a predetermined deadband force differential on spool 144 in the spool position shown in FIG. 3. In this position, spool 144 cannot move until this deadband force is exceeded. Thus, minor variations in fluid pressure to the spool 144 will not result in spool movement which adds stability to the control effect of spool 144. The deadband springs 163 exert only a minor pressure relative to the pressure exerted by spring 142. Conduit 146 connects conduit 122 with spool chambers 136, 138, 140, and conduit 148 (depending upon the position of said spool 144, one position of spool 144 being shown schematically in FIG. 3, another, in FIG. 4 and the third in FIG. 5) connects the outlet port of yoke control valve means 132 with a tank or reservoir 151. Also, adjustable throttle valves 149 are provided in the various conduits, as 125 and 146 to regulate the response of the control system. A relief valve 164 having a reservoir 166 is connected with conduit 112 for usual safety purposes.

Assuming that the mechanism has been operating and that fluid pressure is present in conduit 125 and in balance with the spring pressure of spring 142, then spool 144 will be in the spool position of FIG. 3, and liquid will not flow from conduit 146 through the chambers in spool 144 and the pressure in conduit 112 and in its connecting conduits will remain at the predetermined desired pressure. The rotor of said pump-motor 106 will be rotating because electric motor 104 is energized and yoke 108 of said pump-motor 106 will be held in a given position delivering sufficient fluid under pressure to maintain a predetermined fluid pressure in conduit 112.

Figure 5:
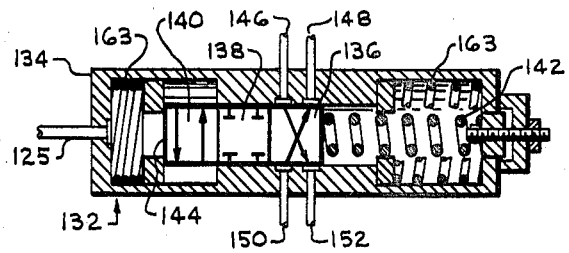
FIG. 5 is a view similar to FIG. 4 and showing a still further position that the schematically illustrated spool may assume.

Next, assuming a condition where the fluid pressure in conduit 112 and the various interconnected conduits, including conduit 146, has dropped (e.g., because of the amount of fluid used by motors 96 and 102), then spring 142 exerts a greater pressure than that of fluid pressure from conduit 112 and the deadband springs 163 and moves spool 144 to the spool position shown in FIG. 5. Then liquid under pressure will flow from conduit 146 to conduit 152 and into the yoke control means 154 and against one side (the right side as shown in FIG. 3) of the piston 158 slidably mounted in housing 156. At the same time, fluid from the other side of piston 158 will exhaust through conduit 150, through valve chamber 136 and through conduit 148 to tank or reservoir 151. This pressure against piston 158 will move piston 158 (to the left relative to the position shown in FIG. 3), and move rod and link means 162 to the solid line position shown in FIG. 3 of the drawings and in turn will move the yoke 108 to said solid line position shown. With the yoke 108 in the solid line position of FIG. 3, motor-pump 106 will function as a pump and fluid will be pumped from tank 110, through then pump 106, through conduit 112 and to the various conduits connected therewith.

When the pressure in conduit 112 and the interconnected conduits, including conduit 125, has reached the predetermined value (determined by spring 142), such fluid pressure will move spool 144 to the right and into the position shown in FIG. 3 of the drawings where valving chamber 138 is in registration with conduits 146, 148, 150, and 152. In such position, the fluid pressure is substantially the same on both sides of piston 158 and hence said piston will remain in any given position. The spring 160 will provide force to initially move piston 158 to the left, as respects the showing in FIG. 3, and in such initial position will permit starting of the mechanism.

Now referring to FIG. 2 of the drawings, the vessels 52 and 54 may be moved relative to each other (toward or away from each other) because of the action of the body of water on which they are supported. The counterweight 64 will pull in or pay out line 58 to compensate for any change in distance between the vessels. However, such counterweight 64 will not compensate for changes in the lengths of towing line 70 and retrieving line 82. In the event of a decrease in length, the motors 78 and 88 will remove the slack. In the event of an increase in their lengths, the said lines 70 and 82 will cause drums 76 and 86 to pay out cable and reverse the directions of their rotations and motor-pumps 78, 88 will function as pumps.

Referring to FIG. 3 and the drums 92 and 98 thereof (the counterparts of drums 30 or 86, and 40 or 76, respectively, of FIGS. 1 and 2), the payout from said drums 92 and 98 causes pump-motors 96 and 102 to function as pumps rather than motors. Thus, the fluid pressure will increase in conduits 112, 113, 122, and 125. Any increase in pressure in conduit 125 (regardless of the reason therefor) will move the slide valve assembly comprising spool 144 to the right as respects the showing in FIG. 3 and into the position shown in FIG. 4 of the drawings. In this position, conduit 146 connects with conduit 150 and pressure is applied to the other side of the piston 158 (to the left as respects the showing in FIG. 3) the conduit 152 connects with conduit 148 and from the latter to the tank or reservoir 151, thus raising the pressure on the side of the piston shown to the left in FIG. 3. Piston 158, rod and link means 162 and yoke 108 will move to the dash line position shown in FIG. 3. Such change of the position of the yoke 108 causes motor-pump 106 to function as a motor (formerly it was functioning as a pump) and the motor 106 overpowers electric motor 104 and the said motor 104 then functions as a generator and the power generated by the motor 106 is dissipated in the form of electrical energy produced by the now generator 104. This energy is delivered to, and used by, the power source connected with now generator 104.

Figure 4:
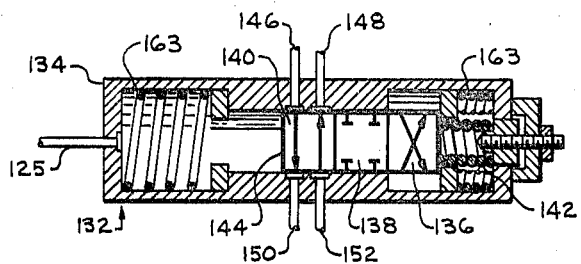
FIG. 4 is a detached view of the hydraulic control valve mechanism shown in FIG. 3 and showing another position that the schematically illustrated spool may assume.

The slide valve assembly comprising spool 144, springs 142 and 163, will assume the position shown in FIG. 5 of the drawings upon a decrease of fluid pressure in conduit 125, will assume the position shown in FIG. 4 upon an increase of fluid pressure in conduit 125, and will assume the position shown in FIG. 3 when the pressure in conduit 125 is in balance with the adjusted force of spring 142. Such action of said slide valve assembly will maintain a constant fluid pressure in a pump 96 or 102 in towing a load away from a head mast or spar (10 or 56 of FIGS. 1 and 2, respectively), and in retrieving or returning the carriage (20 or 66 of FIGS. 1 or 2, respectively) from a tail spar or mast (14 or 60 of FIGS. 1 or 2, respectively). The construction will equalize the fluid pressure to a given selected amount determined by the adjusted spring pressure of spring 142 regardless of rotation of motor-pumps 96 and 102.

In towing a load away from a head mast or spar (such as 10 or 56), the motor 48 or 78 (represented by the motor 102 of FIG. 3) will have a predetermined thrust, such as 10,000 pounds and the motor 44 or 88 (represented by motor 96 of FIG. 3) will have a desired counterthrust to keep the lines taut, such as 1,000 pounds thrust in the opposite direction. Under such circumstances, both motors attempt to haul in cable but motor 102 will overpower the motor 96 and drum 98 hauls in cable and drum 92 pays out cable. The thrust of motor 96 will function as a drag to keep the lines taut. The positions, just described, obtain when the lever 130 is in the dash line position shown in FIG. 3. As the lever 130 moves counterclockwise (as viewed in FIG. 3) toward a center or vertical position, the torque of motor 102 decreases and the torque of motor 96 increases and when the lever 130 reaches a center or vertical position, the torques of the motors 102 and 96 become equal. Further movement of said lever 130 from said center or vertical position causes greater torque in motor 96 and lesser torque in motor 102. When the lever 130 reaches the full line position shown in FIG. 3, then the motor 96 will exert its maximum torque, of say 10,000 pounds and the motor 102 will exert its minimum torque of say 1,000 pounds. Under such circumstances the carriage 20 or 66 will be retrieved or returned to the head mast or spar 10 or 56 as the motor 96 will overpower motor 102 and motor 96 will do the retrieving or returning and the motor 102 will merely provide the drag to keep the line taut. As previously indicated, a maximum torque of motors 96 and 102 will depend upon the adjustment of spring 142 and the resulting pressure in conduit 112 and in the interconnected conduits. A pressure will be selected to be suitable considering such factors as the weight of the cables, weight of the carriage, weight of the load, desired catenary of the towing and retrieving cables, etc. The minimum torques of motors 96 and 102 will depend upon the original minimum setting of the yokes 114 and 116 of such motors. Thus, such figures of 10,000 pounds and 1,000 pounds are merely set forth to indicate figures of different values.

From the foregoing it will now be apparent that we have provided a first variable displacement hydraulic motor-pump 44, 88, or 96, normally functioning as a motor, and having a movable yoke typified by yoke 114. When the yoke 114 is moved in a first direction (as clockwise in FIG. 3), the torque of motor 96 increases and when moved in the reverse direction, the torque of motor 96 decreases. Next, we have provided a second variable displacement hydraulic motor-pump 48, 78, or 102, normally functioning as a motor, and having a movable yoke typified by yoke 116. When the yoke 116 is moved in the first direction (clockwise as respects FIG. 3), the torque of motor 102 decreases and when moved in the reverse direction, the torque of motor 102 increases. The two said motors exert pulls on a common line, a combination line comprising a towing line, as 34 of FIG. 1 or 70 of FIG. 2, and a connected retrieving line, as 24 of FIG. 1 or 82 of FIG. 2, and that the pulls against said combination line are in opposite directions. Thus, as the torque of motor 102 increases while the torque of motor 96 decreases, the motor 102 overpowers motor 96 and a towing line 34 or 70 is pulled in and a retrieving line 24 or 82 is payed out and thus a carriage 20 or 66 is moved from a head spar 10 or 56 toward a tail spar 14 or 60. When the torques of the motors 96 and 102 are equal, the carriages 20 or 66 do not move and when the torque of motor 96 increases and the torque of motor 102 decreases, the motor 96 overpowers the motor 102 and a retrieving line 24 or 82 is pulled in and a towing line 34 or 70 is payed out and thus a carriage 20 or 66 is moved from a tail spar 14 or 60 toward a head spar 10 or 56. In all such instances where a line is being pulled in and the other line is being payed out, one motor provides the pulling force and the other motor which is overpowered, provides a drag on the line that is being payed out and thus both lines remain taut.

The motors 96 and 102 are designed or arranged in paired relation so that the movements of their yokes in a given direction will increase the torque of one motor while decreasing the torque of the other and that movement of the yokes in the opposite direction will produce opposite results. Linkage, as a link means 128, interconnects the yoke 114 of motor 96 with the yoke 116 of motor 102 and thus simultaneous increase of the torque of one motor, as 96, occurs with the decrease of the torque in the other motor, as 102. A ready means of adjusting the relative position of the link means (and the yokes connected therewith) may be by the lever 130.

By connecting a towing line, as 34 or 70 and a retrieving line, as 24 or 82, with each other and providing a combination line and connecting the end portions of such combination line with a variable displacement hydraulic motor-pump, as 102 or 96, then if the supporting means for said combination line, as head spar 56 or tail spar 60, move apart and thus increase tension on the combination line, as 82, 70, this tension will cause one or both of motor-pumps, as 88, 78 to function as a pump or pumps and the said tension will be dissipated as an increase in fluid pressure. Also, by having an electric motor, as 104, drive variable displacement hydraulic motor-pump as 106, to provide fluid under pressure to the first mentioned motor-pumps, as 102, 96, then any increase in pressure to the motor-pump 106 will be dissipated by the electric motor 104 functioning as a generator of electrical energy.

Also, by such connections and by such structures, then if the supporting means, as head spar 56 or tail spar 60, move relatively toward each other, then any tendency to provide slack in the combination retrieving-towing line will readily be overcome by removing said slack by both motors since both motors always attempt to haul in cables.

Further, by such connections and such structures, if the torque of the towing motor, as 102, is equal to the torque of the retrieving motor, as 96, then a carriage, as 20 or 66, will remain stationary.

The towing motor, as 102, and the retrieving motor, as 96, preferably each exerts its thrust, respectively, through reduction gear train 100, drum 98, and reduction gear train 94, and drum 92. Upon each of the drums 98 and 92 is reeved an end portion of the combination towing-retrieving line (34, 70 — 24, 82) and the cable sheave means, as 38, 36 or 72—26 or 84, support said combination line and said cable sheave means are remotely disposed to the cable drums 98, 92.

Preferably, the variable displacement hydraulic motor-pump, as 106, to provide fluid under pressure for the various conduits of our invention, has an overcenter movable yoke, as 108, so if external forces result in an increase of pressure in said conduit over the fluid pressure delivered by said motor-pump 106, said motor-pump 106 may operate as a motor to dissipate such increase of fluid pressure. A preferable way of dissipating energy created when motor-pump 106 is operating as a motor is to connect said motor-pump 106 with an electric motor 104 so that when said electric motor 104 is driven rather than functioning as a driver, such motor 104 will function as a generator and electrical energy so generated may be dissipated into the electrical source for motor 104.

Preferably, we employ a slide valve mechanism having a plurality of spool positions, as shown in FIGS. 3, 4, and 5, wherein one of said spool positions provides for fluid communication between the fluid pressure in the various conduits, as 146, and a reservoir, as 151, for controlling the fluid pressure delivered by the pump, as 106. In connection with said slide valve mechanism (comprising spool 144), we provide a valve control means, as 154, the position of which is responsive to the fluid pressure in the various conduits, as 146, from pump 106, and which valve control means regulates the fluid flow and pressure delivered by pump 106 by adjusting the angular movement of the yoke 108 of the motor 106.

Obviously, changes may be made in the forms, dimensions, and arrangements of the parts of our invention, without departing from the principle thereof, the above setting forth only preferred forms of embodiment of our invention.

We claim:

1. A first variable displacement hydraulic motor having a first movable yoke controlling the output torque thereof, said first yoke when angularly moved in a first direction increasing the output torque of said first motor and when angularly moved in the reverse direction decreasing the output torque of said first motor; a second variable displacement hydraulic motor having a second movable yoke controlling the output torque thereof, said second yoke when angularly moved the said first direction decreasing the output torque of said second motor and when angularly moved in the reverse direction increasing the output torque of said second motor; link means interconnecting said two yokes for simultaneous angular movement in the same direction; control means determining the position of said link means; a first cable drum connected with and driven by said first motor; a second cable drum connected with and driven by said second motor; a cable reeved about said first drum, extending to said second drum, and reeved about said second drum; and with said motors arranged so said first motor exerts a force in one direction on said cable and the second motor exerts a force on said cable in the opposite direction.

2. The combination of claim 1 wherein said first and second motors are each separately connected to a common source of hydraulic pressure.

3. The combination of claim 2 wherein said connection of said motors to a common source of hydraulic pressure comprises high-pressure conduits connecting said first and second motors to a common source of hydraulic fluid under pressure, and low-pressure conduits connecting said first and second motors to a common conduit, thus if either of said motors is reversed in fluid pressure output, the same is delivered to the other thereof.

4. The combination of claim 2 wherein said common source of hydraulic fluid under pressure is a variable displacement hydraulic motor-pump having an overcenter movable yoke and functions as a motor when the yoke thereof is disposed from one side of center and as a pump when said yoke is disposed from the other side of center.

5. The combination of claim 2 wherein said source of hydraulic fluid under pressure is a variable displacement hydraulic motor-pump which is powered by an electric motor.

6. The combination of claim 4 wherein a hydraulic actuated piston means is connected with said yoke of the hydraulic motor-pump and the position of the hydraulic actuated piston means is controlled by the hydraulic pressure of said common source of hydraulic pressure.

7. The combination of claim 6 wherein a sliding spool valve having three positions is disposed between a conduit from said common source of hydraulic pressure to said hydraulic actuated piston means and a discharge reservoir, said three spool positions comprising a first position providing connections between said conduit and one side of said piston means and between the other said piston means and said discharge reservoir; a second position blocking connections between said conduit and said discharge reservoir; and a third position providing a connection between said conduit and the other side of said piston means and between the said one side of said piston means and said discharge reservoir.

8. The combination of claim 7 wherein said sliding spool valve is spring loaded and urged by the spring means thereof in a direction counter to that it is urged by common source of hydraulic pressure.

9. The combination of claim 8 wherein the sliding spool valve has its second position in blocking position between said conduit to the common source of hydraulic pressure and said discharge reservoir when the spring pressure against said sliding spool valve is in balance with the pressure from said common source of hydraulic pressure.

10. The combination of claim 9 wherein deadband springs of predetermined force are provided in the sliding spool valve assembly to set a predetermined force differential which must be overcome to shift the sliding spool vaLve from its said second position.

11. The combination of claim 10 wherein an accumulator is used to cushion pressure surges from the common source of hydraulic pressure.

12. The combination of claim 11 wherein an accumulator functions as a hydraulic power source as the movable yoke of motor-pump passes through the no-flow center position.